(12) United States Patent
Contreras et al.

(10) Patent No.: US 8,154,827 B2
(45) Date of Patent: Apr. 10, 2012

(54) INTEGRATED LEAD SUSPENSION WITH MULTIPLE CROSSOVER COPLANAR CONNECTION OF THE ELECTRICALLY CONDUCTIVE TRACES

(75) Inventors: John Thomas Contreras, Palo Alto, CA (US); Luiz M Franca-Neto, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 939 days.

(21) Appl. No.: 12/172,933

(22) Filed: Jul. 14, 2008

(65) Prior Publication Data

US 2010/0007993 A1 Jan. 14, 2010

(51) Int. Cl.
G11B 5/55 (2006.01)
G11B 21/08 (2006.01)
H05K 1/00 (2006.01)

(52) U.S. Cl. .................. 360/264.2; 360/245.9; 361/749

(58) Field of Classification Search ............. 360/245.8, 360/245.9, 264.2, 266.3; 439/67, 92, 660; 361/749; 174/254, 255, 260, 261, 262
See application file for complete search history.

(56) References Cited

U.S. PATENT DOCUMENTS

| | | | |
|---|---|---|---|
| 5,712,749 A | 1/1998 | Gustafson | |
| 5,717,547 A | 2/1998 | Young | |
| 5,737,152 A | 4/1998 | Balakrishnan | |
| 5,995,328 A | 11/1999 | Balakrishnan | |
| 6,275,358 B1 | 8/2001 | Balakrishnan et al. | |
| 6,731,467 B1 | 5/2004 | Balakrishnan | |
| 6,762,913 B1 | 7/2004 | Even et al. | |
| 6,791,429 B2 | 9/2004 | Mikalauskas | |
| 7,352,535 B2 | 4/2008 | Arya et al. | |
| 7,629,539 B2 * | 12/2009 | Ishii et al. ..................... 174/254 |
| 7,710,688 B1 * | 5/2010 | Hentges et al. ............ 360/245.9 |
| 2006/0158785 A1 | 7/2006 | Arya et al. | |

* cited by examiner

*Primary Examiner* — Craig A. Renner
*Assistant Examiner* — Gustavo Polo
(74) *Attorney, Agent, or Firm* — Thomas R. Berthold

(57) ABSTRACT

An integrated lead suspension (ILS) or flexure has a connection scheme that allows for coplanar and interleaved conductive traces between read/write circuitry and a read/write head in a magnetic recording disk drive. At each end of the flexure there is an island of electrically conductive substrate material with vias in an insulator layer that permit electrical connection to the islands. Conductive traces on the insulator layer are grouped into two sets and extend generally parallel along the length of the flexure, with the traces from one set being interleaved with traces from the other set and each set carrying one of the positive or negative signals. At each of the ends, all of the traces from a set are connected through the vias to the island at that end.

14 Claims, 5 Drawing Sheets

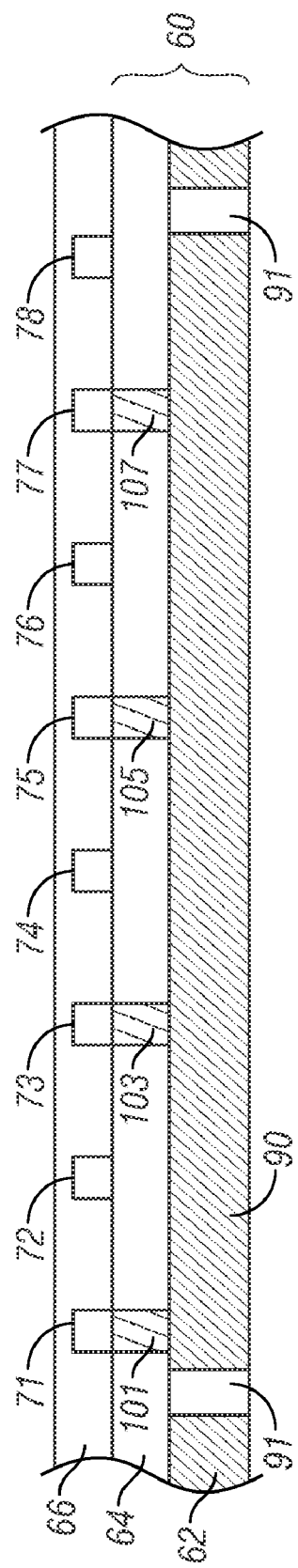

INTEGRATED LEAD SUSPENSION WITH MULTIPLE CROSSOVER COPLANAR CONNECTION OF THE ELECTRICALLY CONDUCTIVE TRACES

BACKGROUND OF THE INVENTION

1. Field of the Invention

The invention relates generally to an integrated lead suspension (ILS) for connection of read/write circuitry to the read/write head in a magnetic recording disk drive, and more particularly to an ILS with interleaved coplanar electrically conductive lines or traces.

2. Description of the Related Art

In magnetic recording disk drives the read/write head is formed on an air-bearing slider that rides on a thin film of air above the rotating disk. A mechanical suspension comprised of a flexure with a gimbal at its end connects the slider to the disk drive's actuator arm. The slider is attached to the gimbal which allows for slight movement on the air bearing as the disk rotates.

Electrical connection is required between the read/write circuitry, typically a read pre-amplifier/write driver module or chip, and the read and write elements on the slider. A suspension that integrates the mechanical connection with the electrical connection is called an integrated lead suspension (ILS). A typical ILS is a generally flexible laminate of a conductive metal substrate like stainless steel, an insulating dielectric layer like polyimide, and electrically conductive copper lines or traces patterned on the dielectric layer.

The write driver circuitry typically provides a single-point input to the ILS for each of the positive and negative write signals (+W and −W). The write driver circuitry provides current through the ILS and then to the write element or head. The write driver circuitry power supply voltage and performance of the current through the write head depends on the characteristic impedance of the ILS traces. Therefore, it is desirable to have an ILS that has a wider characteristic impedance range with low signal losses for the traces carrying the current signal to the write head.

SUMMARY OF THE INVENTION

The invention relates to an integrated lead suspension (ILS) or flexure with a connection scheme that allows the conductive traces to be coplanar and interleaved. The flexure's electrically conductive substrate has conductive islands at each end, with each island located beneath vias in the insulator layer that permit electrical connection to the islands. The conductive traces are grouped into two sets, each set carrying one of the positive or negative write signals. The traces from one set are interleaved with traces from the other set and extend generally parallel along the length of the flexure. At the flexure end connected to the write driver circuitry all of the traces from a first set are connected through the vias to the island at that end. The single-point source (one of the +W and −W signals) from the write driver circuitry is connected to an electrical lead that is coplanar with and connected to one of the traces of the first set. This signal is distributed to the multiple traces of the first set by means of their connection through the vias to the island. In a similar manner, at the other or gimbal end of the flexure the traces from the second set are connected to the island at the gimbal end. The signal (the other of the +W and −W signals) from the traces of the second set is collected by an electrical lead that is coplanar with and connected to one of the traces of the second set and directed to the write element. By having the first set of traces connected to the island at one end of the flexure and the second set of traces connected to the island at the other end of the flexure, there is a balance of the signals at the flexure's signal entry and exit points.

The flexure may also include a plurality of windows or gaps in the conductive substrate along the length of the flexure. The absence of conductive material in the gaps reduces the signal losses caused by the conductive substrate. The interleaving of the traces in the two sets and the gaps in the conductive substrate allow for a wider adjustment of the interconnect characteristic impedance.

For a fuller understanding of the nature and advantages of the present invention, reference should be made to the following detailed description taken together with the accompanying figures.

BRIEF DESCRIPTION OF THE DRAWINGS

FIG. 3B is a sectional view through section 3B-3B of FIG. 3A and illustrates the conductive island of substrate material that provides interconnection of one set of interleaved conductive traces below the insulating dielectric layer of the flexure.

DETAILED DESCRIPTION OF THE INVENTION

Figure 1:
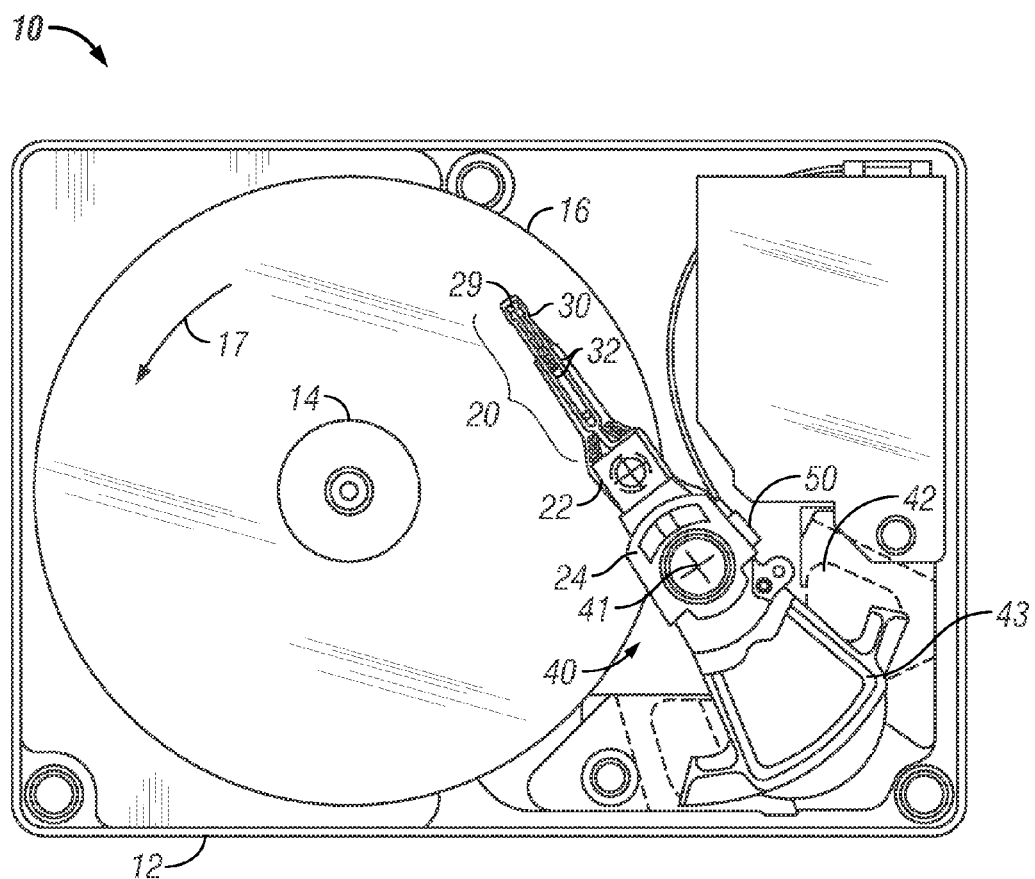
FIG. 1 is a top plan view of a head/disk assembly (HDA) of a hard disk drive and illustrates a flexure having an electrical trace interconnect array according to the present invention.

FIG. 1 is a top plan view of a head/disk assembly (HDA) of a hard disk drive 10. The hard disk drive 10 has at least one load beam assembly 20 having an integrated lead suspension (ILS) or flexure 30 with an array 32 of electrically conductive interconnect traces or lines that connect to a read/write head 29. The load beam assemblies 20 are attached to rigid arms 22 connected to an E-block 24. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier/write driver circuit.

Figure 2A:
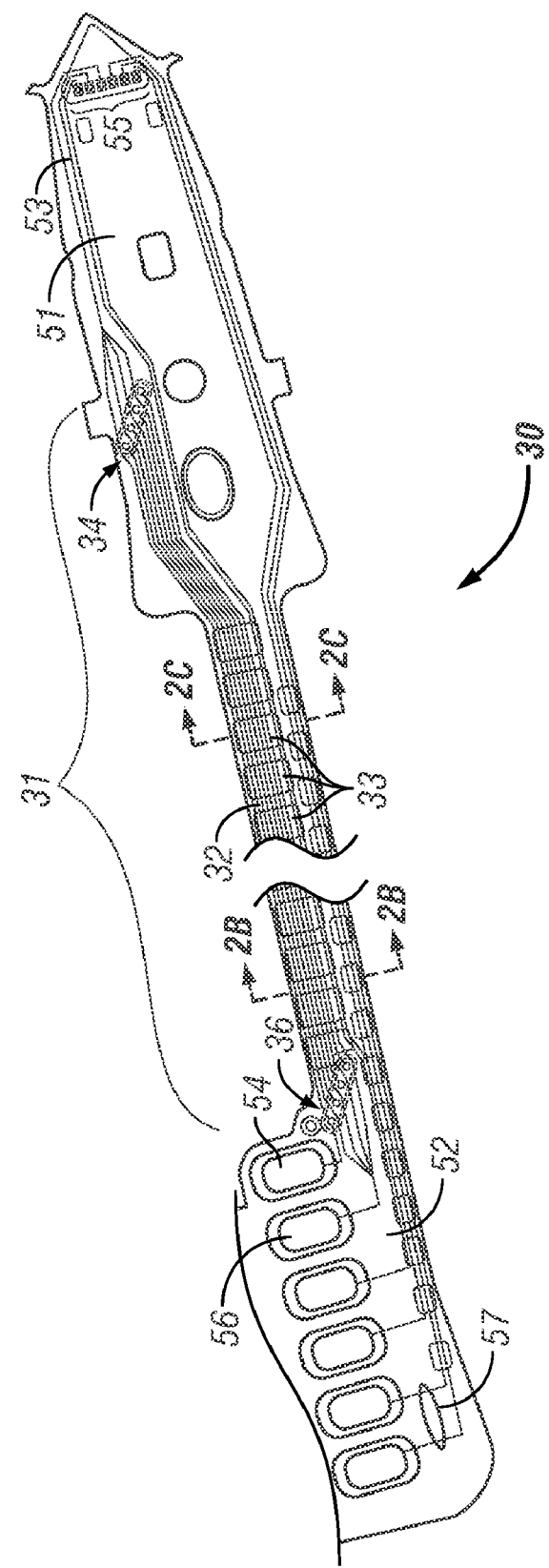
FIG. 2A is a plan view of the flexure showing the elongate segment between the gimbal segment and the pad segment according to the present invention.
Figure 2B:
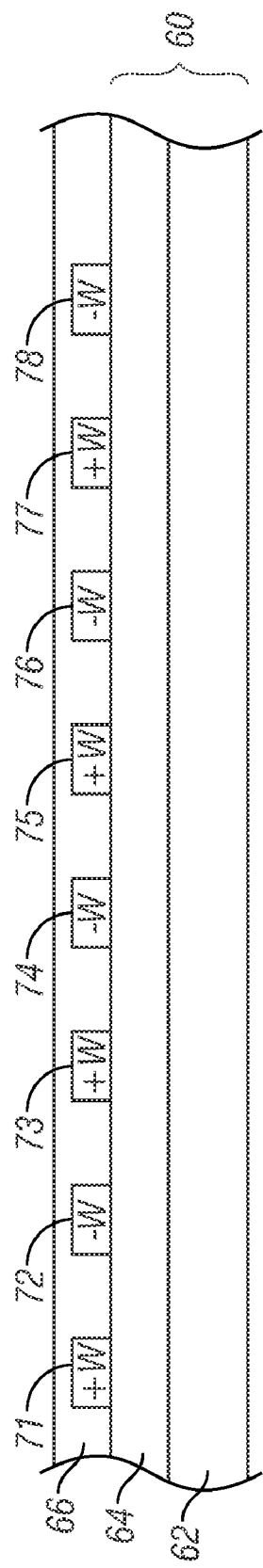
FIG. 2B is an expanded sectional view through section 2B-2B of the flexure in FIG. 2A to illustrate its laminated construction.
Figure 2C:
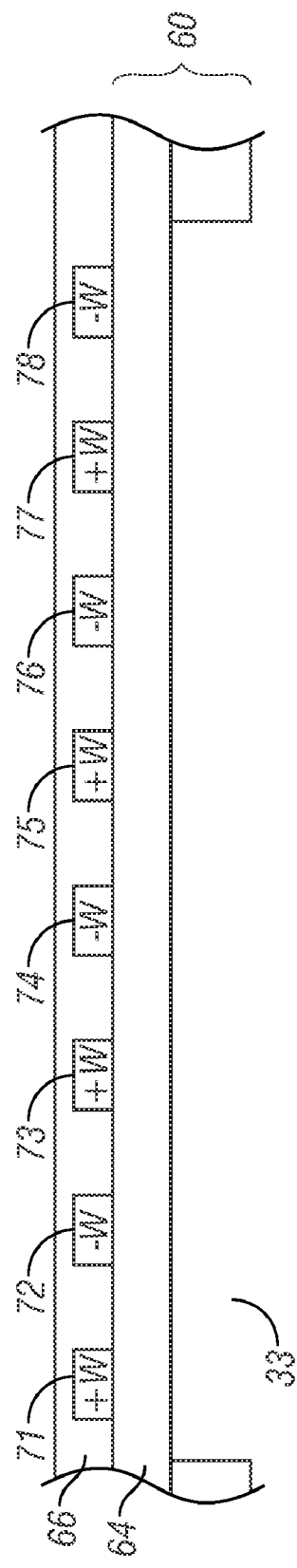
FIG. 2C is an expanded sectional view through section 2C-2C of the flexure in FIG. 2A to illustrate a window or gap in the flexure.
Figure 3A:
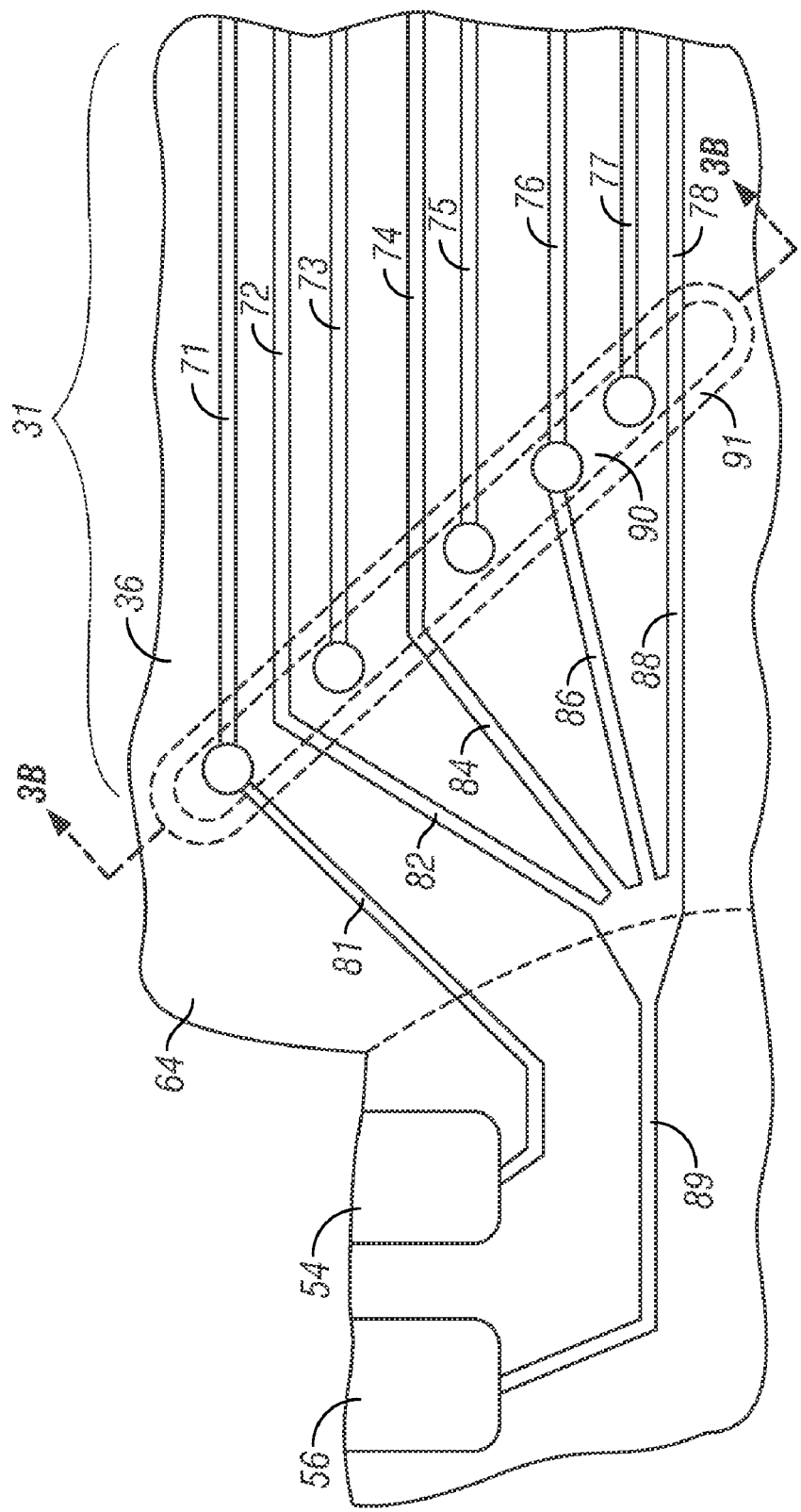
FIG. 3A is a plan view of a portion of one end of the flexure showing the multiple-crossover coplanar connection (MCC) of the conductive traces according to the present invention.

FIG. 2A is a plan view of the flexure 30 showing an elongate segment 31 between a gimbal segment 51 and a pad segment 52 according to the present invention. The flexure 30 is a laminate comprised of three layers: a conductive substrate, an insulating dielectric layer, a conductive layer for the electrical traces or lines, and an optional insulating dielectric cover layer. The gimbal segment 51 supports a slider (not shown) that contains the read/write heads 29 (FIG. 1) and has conductive traces 53 leading to pads 55 for electrical connection to pads on the slider. The flexure 30 has an electrical connection end 34 that is connected to traces 53 on gimbal segment 51. The pad segment 52 has a plurality of electrical connection pads, like pads 54, 56 that are electrically connected to chip 50 (FIG. 1). The flexure 30 has an electrical connection end 36 that is connected to pads 54, 56 on pad segment 52. A plurality of interleaved electrically conductive traces or lines 32, extend generally parallel to one another along the elongate segment of the flexure 30 between flexure ends 34, 36. The lines 32 connect the write driver in chip 50 with the write head on the slider attached to gimbal end 51. The trace interconnect array of lines 32 comprises interleaved lines that are shown in FIGS. 2B, 2C and 3A and are grouped as a first set of lines 71, 73, 75, 77 and a second set of lines 72, 74, 76, 78. The flexure 30 also includes conductive traces or lines 57 that connect the read preamplifier in chip 50 with the read head on the slider attached to gimbal end 51.

FIG. 2B is an expanded sectional view through section 2B-2B of flexure 30 in FIG. 2A and shows its laminated construction. The flexure 30 includes a generally planar support member 60, a plurality of interleaved electrically conductive traces or lines, like lines 71, 73, 75, 77 in a first set and lines 72, 74, 76, 78 in a second set, and an optional insulating dielectric cover layer 66. The lines 71-78 are typically formed of copper and are illustrated as carrying differential write signals (+W and −W) with the signals being interleaved. The support member 60 includes a conductive base or substrate 62, typically formed of metal like stainless steel, and an insulator layer 64, formed of a dielectric material like polyimide, between the traces 71-78 and substrate 62. The support substrate 62 is typically about 18 microns thick and the insulating dielectric layer 64 is typically about 10 microns thick. The optional dielectric cover layer 66 is also typically formed of polyimide to a thickness of about 15 microns over the tops of the lines 71-78.

The flexure 30 also includes a plurality of windows or gaps 33 in substrate 62 of the laminate, as shown in FIG. 2A. This is illustrated in FIG. 2C, which is sectional view of section 2C-2C of FIG. 2A. In the gaps there is no stainless steel below the dielectric layer 64. The gaps reduce the signal losses caused by the conductive substrate 62. The interleaving, the conductive substrate 62, and windows or gaps 33 allow for a wider adjustment of the interconnect characteristic impedance.

FIG. 3A is a plan view of a portion of the flexure 30 showing end 36 and the connection to pads 54, 56. Pad 54 is connected to the +W signal and is connected via lead 81 to line 71, and then to traces or lines 73, 75, 77 below insulating layer 64 in the manner to be described. Pad 56 is connected to the −W signal and is connected directly via lead 89 that fans out to leads 82, 84, 86, 88 that connect to traces or lines 72, 74, 76, 78. The signal lines 71, 73, 75, 77 in the first set and the lines 72, 74, 76, 78 in the second set are interleaved and are coplanar on insulating layer 64 and run generally parallel to one another along the elongate segment 31 of flexure 30. In FIG. 3A, each signal is thus fanned out into four lines, with the +W and −W signals being interleaved as shown. The number of lines can be increased or decreased, for example from the 8 shown to 4, 6, 10, 12 . . . etc., to reach the desired characteristic impedance level. The single-source connections, 54 and 56, allow for a simple 2-pad connection to the adjoining electrical interconnect, which allows for a simple mechanical connection. If space is allowed, multiple interleaved pads can be used.

The end 36 of elongate flexure segment 31 includes a fan-out connection that joins lines 72, 74, 76, and 78 for a single-ended connection to pad 56 via an electrical lead 89. The end 36 includes an island 90 of metal substrate 62 which allows connection of lines 71, 73, 75, 77 to lead 81 below the insulator layer 64. This is illustrated in the cross-sectional view of FIG. 3B. The island 90 of metal substrate material, typically stainless steel, is surrounded by a gap 91 in the metal substrate 62, so that island 90 is electrically isolated from the rest of substrate 62. In addition, the insulating layer 64 includes a plurality of vias 101, 103, 105, 107 filled with electrically conductive material that provide electrical connection between associated lines 71, 73, 75, 77 and the electrically conductive island 90. In this manner the signal from lead 81 is directed to lead 71 and then to each of the other +W signal lines below the insulating layer 64. This enables a multiple-crossover coplanar connection (MCC) so that all 8 lines are coplanar on insulating layer 64. This MCC layout configuration increases the side/edge area to adjacent conductive traces, such that the characteristic impedance range is increased.

The flexure elongate segment 31 has a similar MCC at end 34 near gimbal segment 51 (FIG. 1) that is not shown in FIG. 3A. However, preferably at end 34 it is lines 72, 74, 76, 78 in the second set that are connected through vias down to an island in the substrate 62. Similarly the lines 71, 73, 75, 77 at the end 34 are fanned out and connect to a single electrical lead from gimbal segment 51 to form an electrical connection similar to that shown by lead 89 and leads 82, 84, 86, 88 at end 36. By having the first set of lines connected to an island at one end of the flexure and the second set of lines connected to an island at the other end of the flexure, there is a balance of the conductors' electrical parasitics through the flexure's signal entry and exit points. The vias through the island connections have inherent electrical parasitics. The two signal traces (+W and −W) are balanced, such that both signal traces have a via/island connection. Balanced signal traces reduce the crosstalk to adjacent signal lines, such as the read lines 57 in FIG. 2A.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A conductor assembly for electrically interconnecting first and second electrical components comprising:
    a generally planar support member having a length extending between first and second ends, the support member comprising an electrically conductive substrate and an electrical insulator layer on the substrate, the substrate having a first island near the support member's first end and the insulator layer having a plurality of vias at said first island;
    a first set of generally parallel electrically conductive lines on the insulator layer and extending generally along the length of the support member, each line of said first set having an end located at a via at said first island and electrically connected to said first island and thereby to all other lines in said first set;

a first electrical lead on the insulator layer near said first end and electrically connected to at least one of the lines of the first set and thereby to all lines in said first set; and a second set of generally parallel electrically conductive lines on the insulator layer and extending generally along the length of the support member, the lines of the first and second sets being interleaved along the length of the support member.

2. The assembly of claim 1 wherein the substrate has a second island near the support member's second end, the insulator layer has a plurality of vias at said second island, and each line of said second set has an end located at a via at said second island and electrically connected to said second island and thereby to all other lines in said second set, and further comprising a second electrical lead on the insulator layer near said second end and electrically connected to at least one of the lines of the second set and thereby to all lines in said second set.

3. The assembly of claim 1 wherein all of the lines of the first set are electrically connected on the insulator layer at said second end.

4. The assembly of claim 1 wherein all of the lines of the second set are electrically connected on the insulator layer at said first end.

5. The assembly of claim 1 wherein the substrate includes a plurality of gaps between its ends, the insulator layer and the interleaved lines extending across said gaps.

6. The assembly of claim 1 further comprising an insulating cover layer over the first and second sets of lines.

7. The assembly of claim 1 wherein the first component is a read/write head in a magnetic recording disk drive and the second component is read/write circuitry in the disk drive.

8. A magnetic recording disk drive flexure for electrical connection of a disk drive write driver circuitry with a disk drive write head comprising:

a pad segment for connection to the write driver circuitry, a gimbal segment for connection to the write head, and an elongate segment connected between the pad segment and the gimbal segment, the flexure elongate segment comprising:

a support member comprising an electrically conductive substrate and an electrical insulator layer on the substrate, the substrate having a first island near a first end of the support member and a second island near a second end of the support member and the insulator layer having a plurality of vias at each island;

a first set of generally parallel electrically conductive traces on the insulator layer and extending generally along the length of the support member, each trace of said first set having an end located at a via at said first island and electrically connected to said first island and thereby to all other traces in said first set;

a first electrical lead connecting the flexure pad segment with at least one of the traces of the first set and thereby to all traces in said first set;

a second set of generally parallel electrically conductive traces on the insulator layer and extending generally along the length of the support member, the traces of the first and second sets being interleaved along the length of the support member, each trace of said second set having an end located at a via at said second island and electrically connected to said second island and thereby to all other traces in said second set; and a second electrical lead connecting the gimbal segment with at least one of the traces of the second set and thereby to all traces in said second set.

9. The flexure of claim 8 wherein the substrate includes a plurality of gaps between its ends, the insulator layer and the interleaved traces extending across said gaps.

10. The flexure of claim 8 further comprising an insulating cover layer over the first and second sets of traces.

11. The flexure of claim 8 further comprising a third electrical lead connecting the flexure pad segment with all traces in said first set near said support member's first end.

12. The flexure of claim 8 further comprising a fourth electrical lead connecting the flexure gimbal segment with all traces in said second set near said support member's second end.

13. The flexure of claim 8 wherein the first set of traces is adapted to receive one of a positive write signal and a negative write signal, and the second set of traces is adapted to receive the other of said positive and negative write signals.

14. The flexure of claim 8 wherein the substrate is formed of stainless steel.

* * * * *